(12) United States Patent
Murphy et al.

(10) Patent No.: US 6,661,531 B1
(45) Date of Patent: Dec. 9, 2003

(54) METHOD FOR ADAPTIVELY MATCHING PRINT QUALITY AND PERFORMANCE IN A HOST BASED PRINTING SYSTEM

(75) Inventors: David William Murphy, Nicholasville, KY (US); Gary Scott Overall, Lexington, KY (US); Martin Geoffrey Rivers, Lexington, KY (US); Bryan Scott Willett, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 173 days.

(21) Appl. No.: 09/713,399

(22) Filed: Nov. 15, 2000

(51) Int. Cl.⁷ .............................................. G06K 15/00
(52) U.S. Cl. ...................................... 358/1.15; 347/185
(58) Field of Search ................. 358/1.1–1.9, 1.11–1.18; 347/171, 185, 188, 189, 191, 192

(56) References Cited

U.S. PATENT DOCUMENTS

| | | | |
|---|---|---|---|
| 4,649,501 A | | 3/1987 | Bloom et al. |
| 5,223,937 A | * | 6/1993 | Moriguchi et al. ......... 358/296 |
| 5,297,246 A | | 3/1994 | Horiuchi et al. |
| 5,488,223 A | | 1/1996 | Austin et al. |
| 5,490,237 A | | 2/1996 | Zimmerman et al. |
| 5,596,359 A | * | 1/1997 | Frederic ..................... 347/188 |
| 5,875,044 A | | 2/1999 | Seto et al. |
| 5,913,018 A | * | 6/1999 | Sela .......................... 358/1.17 |
| 5,957,596 A | | 9/1999 | Hastings et al. |
| 5,982,508 A | | 11/1999 | Kashihara |
| 6,006,015 A | | 12/1999 | Bender et al. |
| 6,019,449 A | | 2/2000 | Bullock et al. |
| 6,019,454 A | | 2/2000 | Serra et al. |
| 6,030,072 A | | 2/2000 | Silverbrook |

* cited by examiner

Primary Examiner—Gabriel Garcia
Assistant Examiner—King Y. Poon
(74) Attorney, Agent, or Firm—Ron K. Aust

(57) ABSTRACT

A method for adaptively matching print quality and performance in a host based printing system including a host computer connected to a printer via an interface. The method includes the steps of: determining a print process time corresponding to an amount of time for a page to print based on current printer settings of the printer; determining a quantity of data to be transferred from the host computer to the printer; determining a data transfer time corresponding to an amount of time required to transfer the quantity of data from the host computer to the printer via the interface; comparing the print process time to the data transfer time to determine an amount of time that can be used by the printer to improve print quality; and determining optimum printer settings for the printer based at least in part on the amount of time determined in the comparing step.

35 Claims, 6 Drawing Sheets

METHOD FOR ADAPTIVELY MATCHING PRINT QUALITY AND PERFORMANCE IN A HOST BASED PRINTING SYSTEM

BACKGROUND OF THE INVENTION

1. Field of the Invention

The present invention relates to host based printing, and, more particularly, to a method for adaptively matching print quality and performance in a host based printing system.

2. Description of the Related Art

FIG. 1 illustrates a typical "host based" printing system 10, which includes a host computer 12 and a printer 14. Host computer 12 includes a processor 16, a memory unit 18 and an interface 20. Printer 14 includes a processor 22, a memory unit 24, a printhead data buffer 26 and a printhead 28. Printer 14 is electrically connected to host computer 12 via interface 20. Host computer 12 manipulates image data into a form that can be printed by printer 14, and the print data is then sent via the interface 20 to printer 14 for printing. Memory unit 24 of printer 14 is used to store, for example, printer information, such as printer configuration information, and print data. Host computer 12 executes a significant number of the instructions necessary for printing with printer 14. By using the capabilities of the electrical processor 16 in host computer 12, the electrical processor 22 and memory 24 requirements in printer 14 may be reduced, thereby reducing complexity and cost of the printer.

Such a host based printing system can include a multi-color printer that typically includes a multi-color printhead, such as printhead 28, having a plurality of ink emitting orifices therein. The ink emitting orifices may be segregated into different arrays of ink emitting orifices, with each array corresponding to the different colors of inks that are to be jetted onto the print medium. Associated with each of the ink emitting orifices in the different arrays of ink emitting orifices is a corresponding ink jet heater. An actuation of a particular ink jet heater causes the formation of a bubble within the ink disposed adjacent thereto, and the ink is expelled from the associated ink emitting orifice. Host computer 12 transmits raster information to printer 14 via interface 20 for selective actuation of the ink jetting heaters of printer 14. The processor 22 of printer 14 then sends the print data to printhead data buffer 26 in preparation for printing by printhead 28.

It is known that the print quality (PQ) of an ink jet printer can be improved by moving the printhead across the print medium in a direction transverse to the advance direction of the print medium and controlling the sequencing and/or timing of the placement of the ink dots on the print medium to inhibit the formation of an objectionable print artifact. For example, a "shingling" printing technique uses multiple passes of the printhead and places only a portion of the ink dots on the print medium during any particular pass of the printhead to avoid the formation of a color/black banding artifact on the print medium in the event a color ink jet cartridge is utilized. However, shingling significantly decreases the media throughput rate (i.e., performance) of the printer.

Other factors that have an impact on the print quality/performance dichotomy are, for example, bi-directional vs. unidirectional printing, carrier velocity, and double-dotting.

Thus, in an ink jet printing system, it is often the case that achieving high performance, e.g., an increased media throughput rate, of the printer and achieving high print quality with the printer are mutually exclusive goals, since improvements in one area deleteriously impacts the other. However, there is always a baseline amount of time that any print job will take regardless of the print quality settings. In some host based printing systems, for example, the rate at which the printer can print data exceeds the rate at which the interface between the host computer and the printer can supply print data to the printer.

What is needed in the art is a method for adaptively matching print quality and performance in a host based printing system.

SUMMARY OF THE INVENTION

The present invention provides a method for adaptively matching print quality and performance in a host based printing system.

The invention comprises, in one form thereof, a method for adaptively matching print quality and performance in a host based printing system that includes a host computer connected to a printer via an interface. The method includes the steps of: determining a print process time corresponding to an amount of time for a page to print based on current printer settings of the printer; determining a quantity of data to be transferred from the host computer to the printer; determining a data transfer time corresponding to an amount of time required to transfer the quantity of data from the host computer to the printer via the interface; comparing the print process time to the data transfer time to generate a PQ delay budget, the PQ delay budget corresponding to an estimated amount of time that can be used by the printer to improve print quality without adversely impacting printing performance; generating a prioritized list of print quality improvements for the printer, wherein each print quality improvement in the prioritized list identifies at least one print quality setting for the printer; correlating the PQ delay budget to a first print quality improvement from the prioritized list of proposed print quality improvements; and determining whether to modify the current printer settings with the first print quality improvement.

Another aspect of the invention also is directed to a method for adaptively matching print quality and performance in a host based printing system including a host computer connected to a printer via an interface. The method includes the steps of: generating a PQ delay budget, the PQ delay budget corresponding to an estimated amount of time that can be used by the printer to improve print quality without adversely impacting printing performance; generating a prioritized list of print quality improvements for the printer, wherein each print quality improvement in the prioritized list identifies at least one print quality setting for the printer; correlating the PQ delay budget to a first print quality improvement from the prioritized list of proposed print quality improvements; and modifying the current printer settings with the first print quality improvement. In one embodiment of the invention, the method further includes the steps of monitoring a data transfer rate during a printing of the page; determining whether the data transfer rate during the printing of the page has increased; and if the data transfer rate during the printing of the page has increased, then stepping down the prioritized list to a next less beneficial print quality improvement.

Still another aspect of the invention also is directed to a method for adaptively matching print quality and performance in a host based printing system including a host computer connected to a printer via an interface. The method includes the steps of: generating a prioritized list of proposed print quality improvements for the printer; dividing a page of image data to be printed into a plurality of regions; and generating a PQ delay budget for each region of the plurality of regions, each PQ delay budget corresponding to an estimate of the amount of time that can be used by the printer to improve print quality from that available with current printer settings without adversely impacting printing performance of the printer; correlating each PQ delay budget for each region to a corresponding print quality improvement from the prioritized list of proposed print quality improvements; and determining whether to modify the current printer settings with the corresponding print quality improvement on a region-by-region basis.

Still another aspect of the invention also is directed to a method for adaptively matching print quality and performance in a host based printing system including a host computer connected to a printer via an interface. The method includes the steps of: determining a print process time corresponding to an amount of time for a page to print based on current printer settings of the printer; determining a quantity of data to be transferred from the host computer to the printer; determining a data transfer time corresponding to an amount of time required to transfer the quantity of data from the host computer to the printer via the interface; comparing the print process time to the data transfer time to generate a PQ delay budget, the PQ delay budget corresponding to an estimated amount of time that can be used by the printer to improve print quality without adversely impacting printing performance; and determining optimum printer settings for the printer based on the PQ budget.

Still another aspect of the invention also is directed to a method for adaptively matching print quality and performance in a host based printing system including a host computer connected to a printer via an interface. The method includes the steps of: determining a print process time corresponding to an amount of time for a page to print based on current printer settings of the printer; determining a quantity of data to be transferred from the host computer to the printer; determining a data transfer time corresponding to an amount of time required to transfer the quantity of data from the host computer to the printer via the interface; comparing the print process time to the data transfer time to determine an amount of time that can be used by the, printer to improve print quality; and determining optimum printer settings for the printer based at least in part on the amount of time determined in the comparing step.

An advantage of the present invention is that the time required to print a document is used efficiently to improve the print quality of the document.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
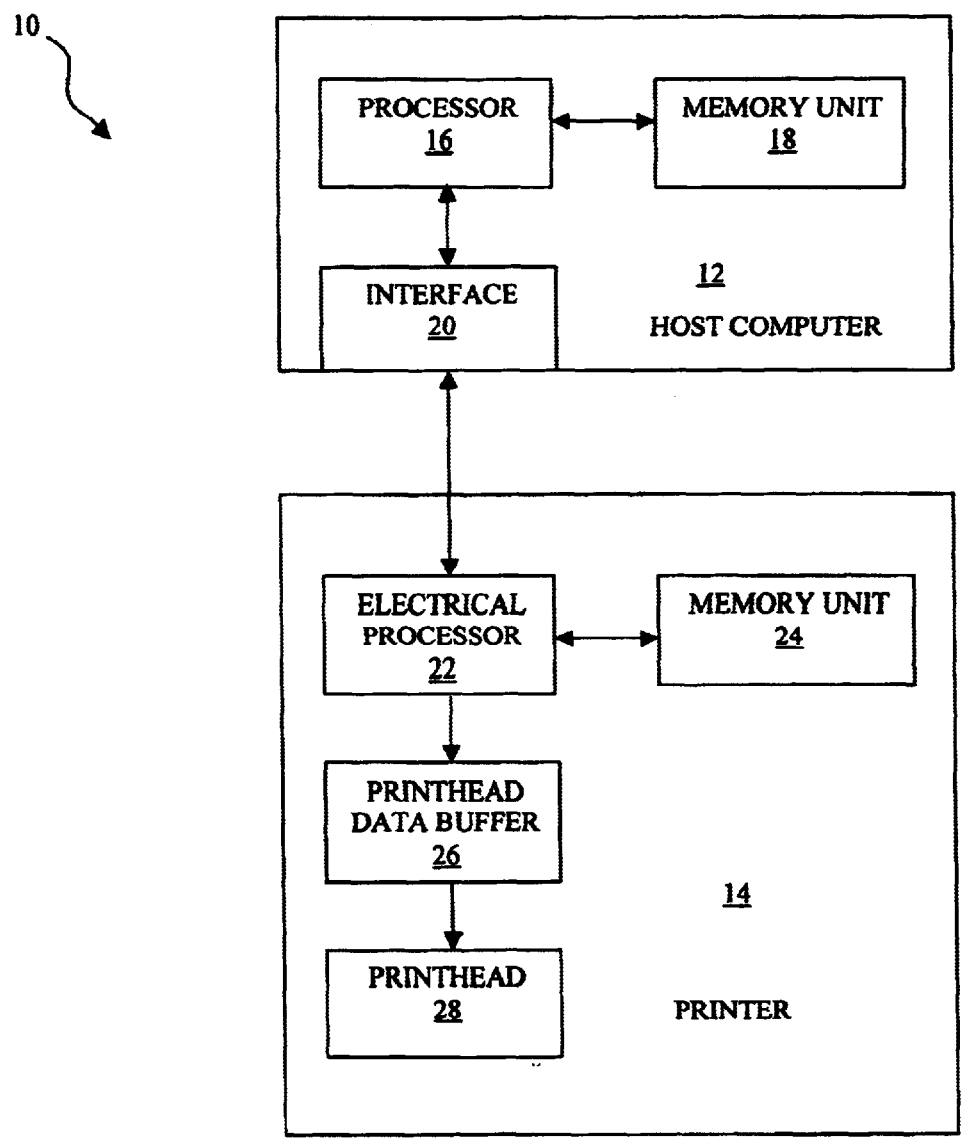
FIG. 1 is a block diagram illustrating a conventional host based printing-system having a host computer connected to a printer.
Figure 2A:
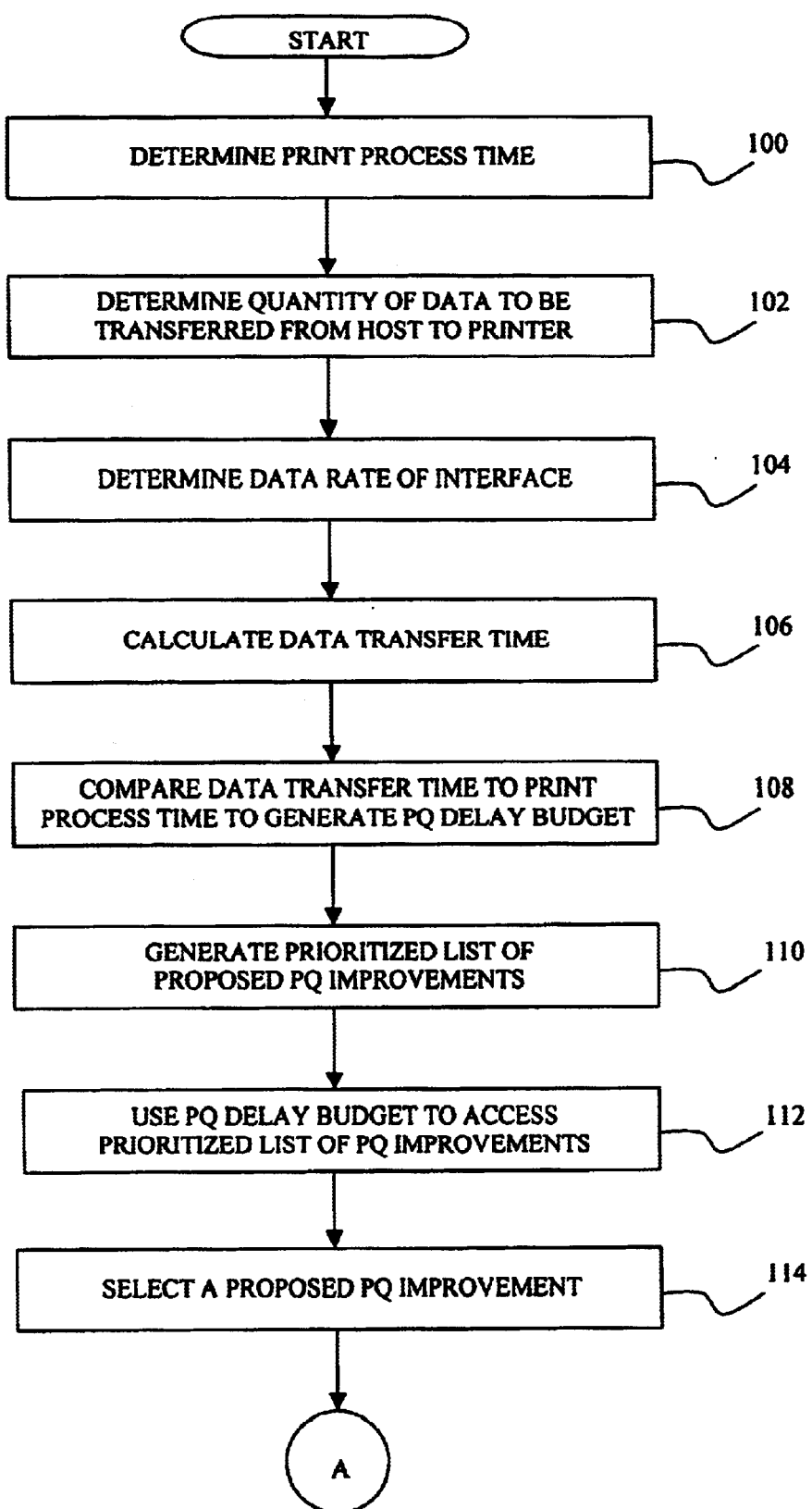
FIGS. 2A and 2B show flowcharts of a method of a first embodiment of the invention.
Figure 2B:
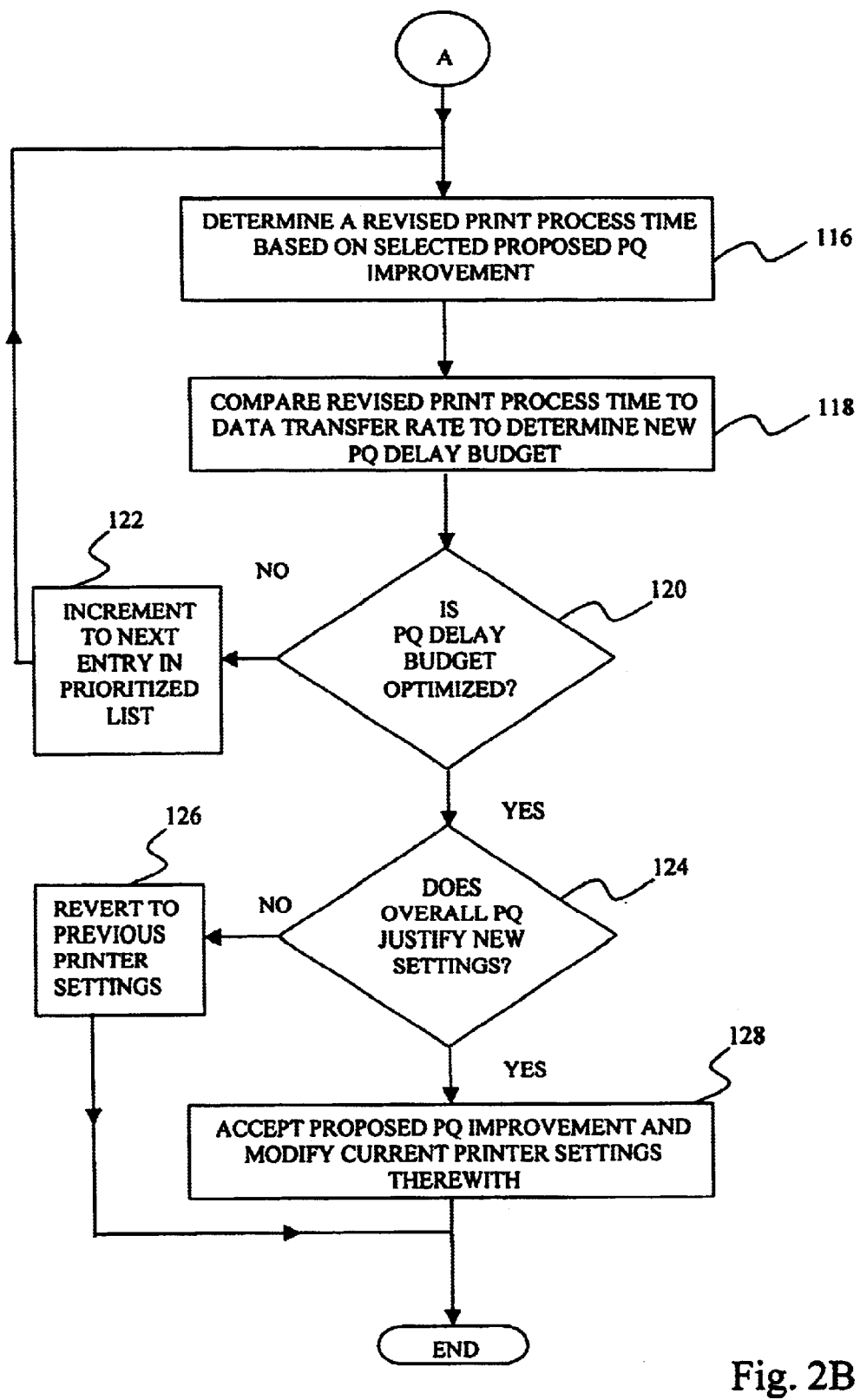

Referring now to the drawings, and particularly to FIGS. 2A and 2B, there is illustrated a method of a first embodiment of the invention for adaptively matching print quality and performance in a host based printing system. The method detects when the performance of an imaging apparatus, such as an ink jet printer, will be impacted by the host interface (e.g., the interface causes delays that do not have any benefit for the end-user) and in those cases, uses the wasted time to improve print quality rather than just stalling the print head. Hereinafter, at times the host computer will simply be referred to as the "host."

Referring to FIG. 2A, at step 100, an estimate of how long a page will take to print is determined. This will be referred to as the "print process time." The estimate of the print process time is based upon a "blocked" map of the page that is passed to the printer at the beginning of a print job. The blocked map contains information about where on the page the image data will be printed, and in which of the color planes (e.g., cyan, magenta, yellow and black) the image data resides. This information is coupled with the current printer settings (e.g., shingling, bi-directional vs. unidirectional printing, carrier velocity, etc.) and the geometry of the printhead to determine how long the page will take to print using the current printer settings.

Next, at step 102, it is determined how much data is to be transferred from the host to the printer. This can either be an exact determination if the host has the information available, or it can be a host-generated approximation calculated by using a pre-compressed file size and an estimated compression ratio.

At step 104, the printer determines an estimate of the data rate for the given interface of the host system for the given job. Due to the intricacies of the host and the interface link, it is preferred that this estimate is derived for each page to be printed. To determine this estimate, the printer times how long it takes to receive a small portion of the data across the interface. The size of this "small portion" should be large enough to average out very high frequency effects on the data rate. Alternatively, if timings are unavailable, approximations can be generated and used based on the port type, e.g., parallel vs. serial; the port mode, e.g., parallel ECP vs. byte-mode; data wrapping, e.g., NPAP (Network Printing Alliance Protocol); and other characteristics of the interface link.

At step 106, the printer calculates a data transfer time based upon the amount of data to be received and the estimated data rate.

At step 108, the data transfer time is compared with the print process time to produce a "PQ delay budget." The significance of the PQ delay budget is that it is an estimate of the amount of time that can be used by the printer to improve print quality without adversely impacting printing performance. In other words, the PQ delay budget is an estimate of the amount of time that the printhead would be stalled doing nothing if no changes were made to the printer's PQ settings.

At step 110, a prioritized PQ improvement list is generated. The actual time of generation of the prioritized PQ improvement list is not critical, so long as the list is generated prior to reaching step 112. The prioritized PQ improvement list is stored in a memory unit of the host-based system. The prioritized list represents a prioritization of certain printer settings, including groups of settings, based on their favorable impact on print quality. For example, perhaps going from bi-directional printing to uni-directional printing gives a better PQ improvement than going from no shingling to 50% shingling. Thus, in the prioritized list the unidirectional printing would be ranked in relation to 50% shingling to indicate its more beneficial impact on print quality. The actual ranking will be dependent on the particular printer mechanism. However, in general, the printer will execute the prioritized improvement list based on the PQ delay budget. For purposes of this disclosure, the terms "next more beneficial print quality improvement" and "next less beneficial print quality improvement" will be used to refer to entries in the prioritized list immediately adjacent to a current print quality improvement under consideration.

At step 112, the printer uses the PQ delay budget to access the "prioritized PQ improvement list." At step 114, based on the PQ delay budget, a proposed PQ improvement is selected.

Referring now to FIG. 2B, step 116, with each proposed PQ improvement, the printer will determine a revised print process time based on the proposed PQ improvement selected from the prioritized list, i.e., the process re-evaluates the estimate of how long it will take to print the page and, at step 118, compares the revised print process time to the estimated data transfer time to determine if the new printer settings will still result in printhead stalls at the estimated data transfer rate determined at step 104.

At step 120, it is determined whether the PQ delay budget is optimized based upon the outcome of the comparison in step 118. If it is determined that printhead stalls will still occur, then the PQ delay budget is not optimized. If it is determined that printhead stalls will not still occur, then the PQ delay budget is optimized. If it is determined that the PQ delay budget is not optimized, then the process proceeds to step 122 to increment to the next more beneficial PQ improvement listed in the prioritized PQ improvement list, and thereafter the process proceeds back to step 116 in order to determine whether the next more beneficial PQ improvement results in an optimized PQ delay budget.

Otherwise, at step 124, a value judgment is made to determine if the overall print quality achieved without any head stalls (e.g., the system is PQ-bound rather than interface link-bound) is justified with the new printer settings set forth in the proposed PQ improvement, or if the overall print quality/performance tradeoff was better with the previously selected printer settings and a head stall. The judgment at step 124 will be impacted by the prior print quality settings that the user selected, the installed media type, the content of the page (image vs. graphics), etc. If the judgment is NO, then the process proceeds to step 126, and the printer will revert to the previous printer settings. If the judgment is YES, then at step 128 the new printer settings are accepted, and the prior "current" printer settings (see step 100 above) are modified by the new printer settings identified in the proposed PQ improvement.

Figure 3:
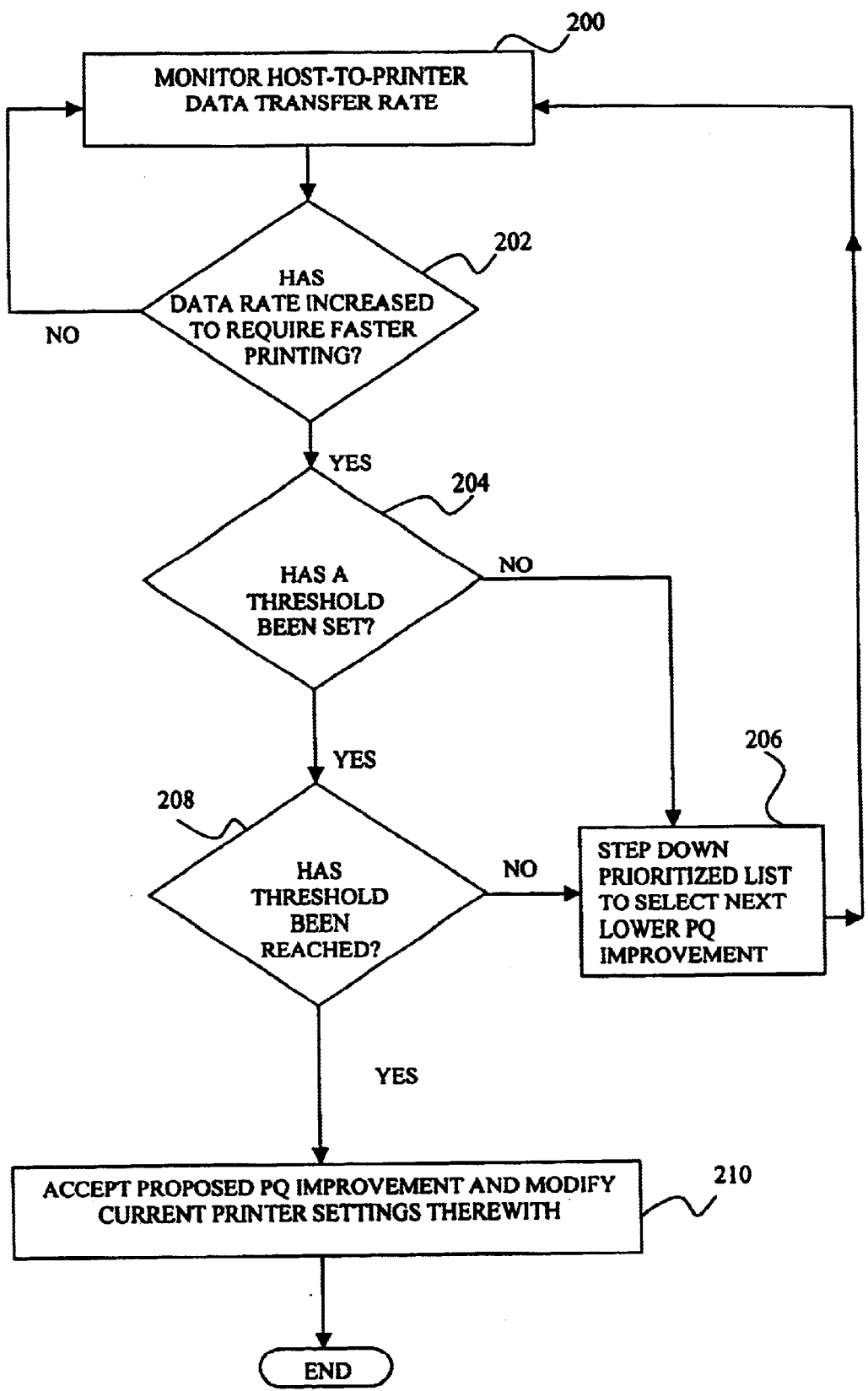
FIG. 3 shows a flowchart of a method of a second embodiment of the invention.

A second embodiment of the invention will be described in relation to FIGS. 2A, 2B and 3. In the second embodiment of the invention, after step 128, rather than the process ending, the process proceeds to step 200, wherein during the printing of the page, the host-to-printer data transfer rate will continue to be monitored. At step 202, it is determined whether the data rate has increased to a level that is inconsistent with the new printer settings, i.e., whether faster printing is necessary to keep up with the data rate at which the data is being received by the printer. If NO, then the process proceeds back to step 200 to monitor the host-to-printer data transfer rate. If YES, then the process proceeds to step 204 where it is determined whether the user has selected a threshold below which no "step-down" in the PQ priority list would be executed.

At step 204, if it is determined that no such threshold is set, then the process proceeds to step 206 and the printer performs a step-down of the prioritized PQ improvement list by no longer performing the PQ enhancing techniques currently selected and selecting the prior (next less beneficial) PQ improvement from the prioritized PQ improvement list. At the end of step 206, the process proceeds back to step 200. If at step 204 it is determined that a threshold is set, then the process proceeds to step 208 to determine whether the threshold has been reached.

If the decision at step 208 is NO, then the process proceeds to step 206 where the printer performs a step-down of the prioritized PQ improvement list by no longer performing the PQ enhancing techniques currently selected and selecting the prior (next less beneficial) PQ improvement from the prioritized PQ improvement list. If the decision at step 208 is YES, then at step 210 the then current PQ improvement from the prioritized PQ improvement list is accepted, and the then current printer settings are modified therewith.

Figure 4A:
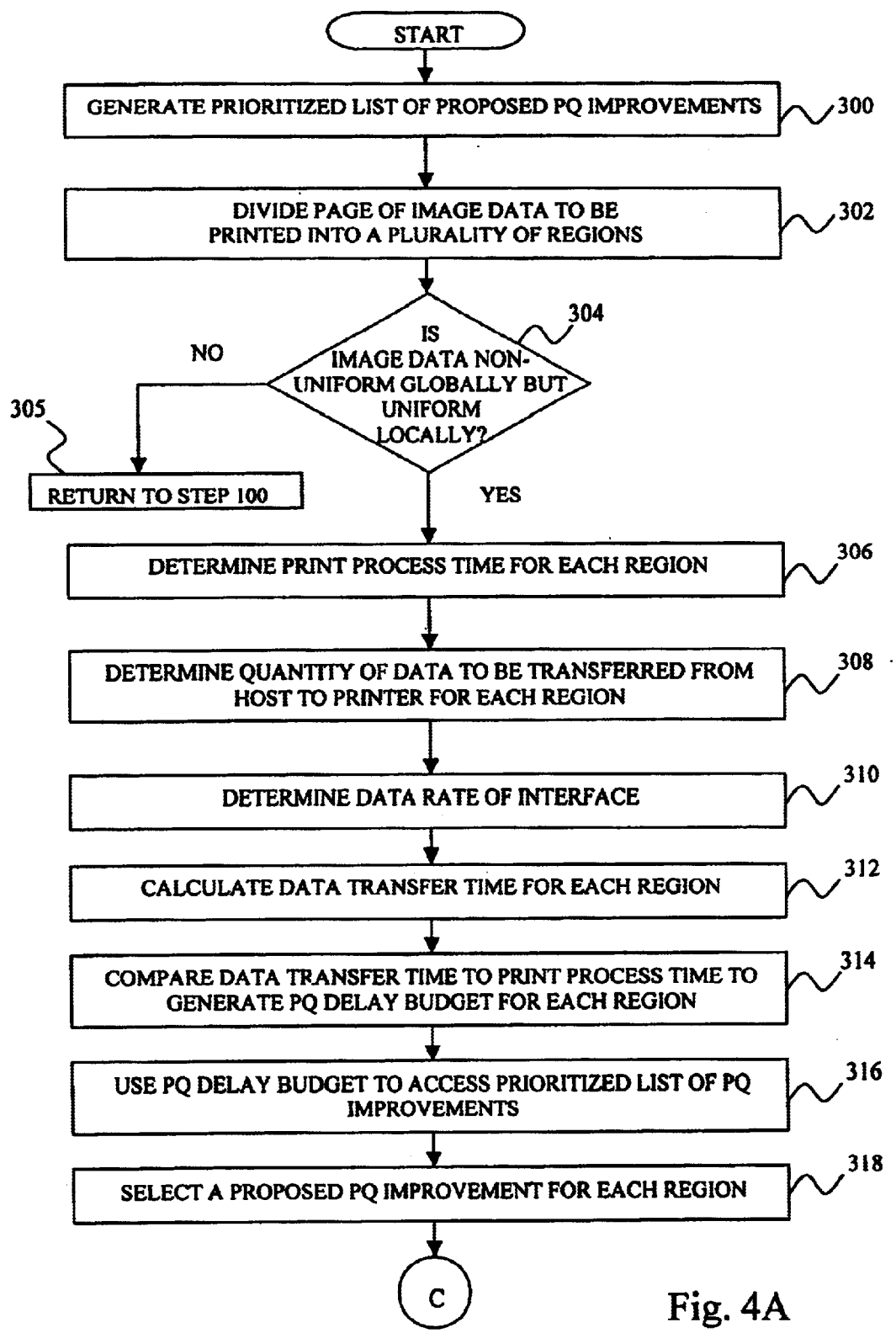
FIGS. 4A and 4B show flowcharts of a method of a third embodiment of the invention.
Figure 4B:
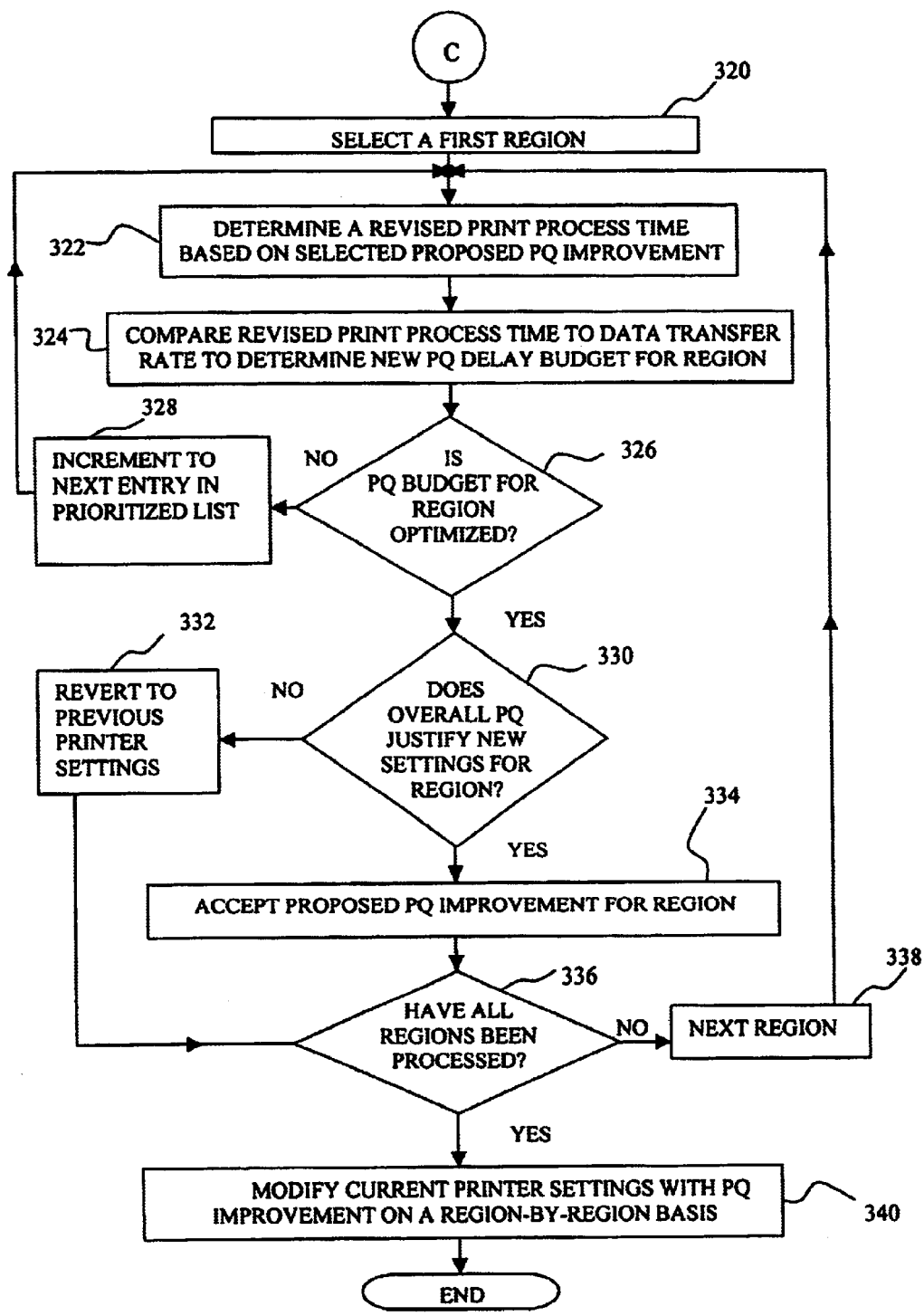

In a third embodiment of the invention, as depicted in FIGS. 4A and 4B, a further optimization can be realized by treating regions of the page independently. The third embodiment can be used in conjunction with the concepts of either of the first and second embodiments discussed above. An example of the type of page on which the third embodiment would be particularly useful is a page that has a smooth image on the top of the page and a lot of small text on the bottom of the page, wherein the image data of the top of the page might compress quite well, whereas the image data at the bottom might compress poorly. In this case, for example, the top of the page could be designated as a first region and the bottom of the page could be designated as a second region. In the third embodiment, each distinct region of the page will be subject to analysis for an associated print process time and a data transfer time.

Referring to FIGS. 4A and 4B, at step 300, a prioritized PQ improvement list is generated. At step 302, the page of image data to be printed is divided into a plurality of regions. At step 304, it is determined from the blocked page map whether the density of the image data is non-uniform globally, but is uniform locally.

If the determination at step 304 is NO, at step 306 the process proceeds back to step 100 of FIG. 2A, and thereafter the method steps of either of the first embodiment or the second embodiment of the invention can be executed to select the printer settings on a page basis, rather than a region-by-region basis.

If the determination at step 304 is YES, then beginning at step 306 the printer treats each uniform local region separately. At step 306, a print process time is determined for each of the plurality of regions. At step 308, it is determined the quantity of data that is to be transferred from the host to the printer for each region. This can either be an exact determination if the host has the information available, or it can be a host-generated approximation calculated by using pre-compressed file size and an estimated compression ratio.

At step 310, the printer determines an estimate of the data rate for the given interface of the host system for the given job. At step 312, the printer calculates a data transfer time for each region based upon the amount of data to be received and the estimated data rate.

At step 314, the data transfer time is compared with the print process time to produce a PQ delay budget for each region. At step 316, the printer uses the PQ delay budget to access the prioritized PQ improvement list. At step 318, based on the PQ delay budget, a proposed PQ improvement for each region is selected.

At step 320, a first region to be considered is selected. At step 322, with the proposed PQ improvement for the region of interest, the printer will determine a revised print process time based on the proposed PQ improvement selected from the prioritized list, i.e., the process re-evaluates the estimate of how long it will take to print the page and, at step 324, compares the revised print process time to the estimated data transfer time to determine a new PQ delay budget for the region.

At step 326, it is determined whether the PQ delay budget is optimized based upon the outcome of the comparison in step 324. If it is determined that printhead stalls will still occur, then the PQ delay budget for the region is not optimized. If it is determined that printhead stalls will not still occur, then the PQ delay budget for the region is optimized.

If at step 326 it is determined that the PQ delay budget for the region is not optimized, then the process proceeds to step 328 to increment to the next (i.e. next more beneficial) proposed PQ improvement listed in the prioritized PQ improvement list to select the next proposed PQ improvement for the region of interest, and thereafter the process proceeds back to step 322.

If at step 326 it is determined that the PQ delay budget for the region is optimized, then the process proceeds to step 330 wherein a value judgment is made to determine if the overall print quality achieved in the region without any head stalls (e.g., the system is PQ-bound rather than interface link-bound) is justified with the new printer settings set forth in the proposed PQ improvements for the region, or if the overall print quality/performance tradeoff was better with the previously selected printer settings and a head stall. If the judgment at step 330 is NO, then the process proceeds to step 332, and the printer will revert to the previous printer settings for the region. If the judgment at step 330 is YES, then at step 334 the new printer settings defined by the proposed PQ improvements for the region of interest are accepted.

After either step 332 or 334, the process proceeds to step 336, where it is determined whether all regions have been processed. If the determination at step 336 is NO, then the next region of interest is selected. The process then proceeds back to step 322. If the determination at step 336 is YES, then the process proceeds to step 340.

At step 340, the then current printer settings are modified with the PQ improvement for the region of interest, on a region-by-region basis. By analyzing the print process time to data transfer time comparison on a region-by-region basis, print quality (PQ) improvements can be selectively applied to certain regions, whereas other regions can remain unchanged, based on the content and printing characteristics of each region.

Those skilled in the art will recognize that the method steps of the embodiments identified above may be converted to computer program instructions executable by one of the host or the printer processor of the host based printing system. Such program instructions would be stored in a memory, such as for example a read-only-memory (ROM), which is accessible by the processor executing the program instructions. Systems in which the instructions are executed at the host will require the ability of the host to retrieve printer configuration setting information from the printer and to control an application of the selected PQ improvement to affect the associated printer settings on the printer.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for adaptively matching print quality and performance in a host based printing system including a host computer connected to a printer via an interface, the method comprising the steps of:

determining a print process time corresponding to an amount of time for a page to print based on current printer settings of said printer;

determining a quantity of data to be transferred from said host computer to said printer;

determining a data transfer time corresponding to an amount of time required to transfer said quantity of data from said host computer to said printer via said interface;

comparing said print process time to said data transfer time to generate a PQ delay budget, said PQ delay budget corresponding to an estimated amount of time that can be used by said printer to improve print quality without adversely impacting printing performance;

generating a prioritized list of print quality improvements for said printer, wherein each print quality improvement in said prioritized list identifies at least one print quality setting for said printer;

correlating said PQ delay budget to a first print quality improvement from said prioritized list of proposed print quality improvements; and determining whether to modify said current printer settings with said first print quality improvement.

2. The method of claim 1, wherein said step of determining whether to modify said current printer settings further comprises the steps of:

determining a revised print process time based on said first print quality improvement;

comparing said revised print process time to said data transfer time to determine a new PQ delay budget; and determining whether said new PQ delay budget is optimized.

3. The method of claim 2, wherein in said step of determining whether said new PQ delay budget is optimized, if it is determined that a printhead of said printer will be stalled due to waiting on print data to be received via said interface, then said new PQ delay budget is not optimized, and if it is determined that said printhead of said printer will not be stalled due to waiting on print data to be received via said interface, then said new PQ delay budget is optimized.

4. The method of claim 3, wherein if it is determined that said new PQ delay budget is not optimized, then further comprising the method steps of:
   incrementing from said first print quality improvement to a next more beneficial print quality improvement in said prioritized list; and
   determining whether said next more beneficial print quality improvement results in said optimized PQ delay budget.

5. The method of claim 3, wherein if it is determined that said PQ delay budget is optimized, then further comprising the method step of determining whether an overall print quality resulting from said first print quality improvement is justified based on at least one of a media type and a content of said page.

6. The method of claim 5, wherein if it is determined that said overall print quality resulting from said first print quality improvement is not justified, then further comprising the step of reverting back to said current printer settings.

7. The method of claim 5, wherein if it is determined that said overall print quality resulting from said first print quality improvement is justified, then further comprising the step accepting said first print quality improvement.

8. The method of claim 7, wherein following said accepting step said current printer settings are modified by said first print quality improvement.

9. The method of claim 1, wherein said current printer settings are modified with said first print quality improvement if said first print quality improvement will result in no stalls of said printhead due to said printer waiting on print data to be received via said interface.

10. A method for adaptively matching print quality and performance in a host based printing system including a host computer connected to a printer via an interface, the method comprising the steps of:
   generating a PQ delay budget, said PQ delay budget corresponding to an estimated amount of time that can be used by said printer to improve print quality without adversely impacting printing performance;
   generating a prioritized list of print quality improvements for said printer, wherein each print quality improvement in said prioritized list identifies at least one print quality setting for said printer;
   correlating said PQ delay budget to a first print quality improvement from said prioritized list of proposed print quality improvements; and
   modifying said current printer settings with said first print quality improvement.

11. The method of claim 10, further comprising the steps of:
   monitoring a data transfer rate during a printing of said page;
   determining whether said data transfer rate during said printing of said page has increased; and
   if said data transfer rate during said printing of said page has increased, then stepping down said prioritized list to a next less beneficial print quality improvement.

12. The method of claim 11, further comprising the step of accepting said next less beneficial print quality improvement and modifying said current printer settings therewith.

13. The method of claim 10, further comprising the steps of:
   monitoring a data transfer rate during a printing of said page;
   determining whether said data transfer rate during said printing of said page has increased;
   determining whether a threshold print quality improvement has been reached; and
   if said data transfer rate during said printing of said page has increased and if said threshold print quality improvement has not been reached, then performing the further step of stepping down the prioritized list to a next less beneficial print quality improvement.

14. The method of claim 13, further comprising the step of accepting said next less beneficial print quality improvement and modifying said current printer settings therewith.

15. A method for adaptively matching print quality and performance in a host based printing system including a host computer connected to a printer via an interface, the method comprising the steps of:
   generating a prioritized list of proposed print quality improvements for said printer;
   dividing a page of image data to be printed into a plurality of regions; and
   generating a PQ delay budget for each region of said plurality of regions, each said PQ delay budget corresponding to an estimate of the amount of time that can be used by said printer to improve print quality from that available with current printer settings without adversely impacting printing performance of said printer;
   correlating said each PQ delay budget for said each region to a corresponding print quality improvement from said prioritized list of proposed print quality improvements; and
   determining whether to modify said current printer settings with said corresponding print quality improvement on a region-by-region basis.

16. The method of claim 15, wherein said step of determining whether to modify said current printer settings further comprises the steps of:
   determining a revised print process time based on said corresponding print quality improvement;
   comparing said revised print process time to a data transfer time to determine a new PQ delay budget; and
   determining whether said new PQ delay budget is optimized.

17. The method of claim 16, wherein in said step of determining whether said new PQ delay budget is optimized, if it is determined that a printhead of said printer will be stalled due to waiting on print data to be received via said interface, then said new PQ delay budget is not optimized.

18. The method of claim 16, wherein in said step of determining whether said new PQ delay budget is optimized, if it is determined that printhead of said printer will not be stalled due to waiting on print data to be received via said interface, then said new PQ delay budget is optimized.

19. The method of claim 16, wherein if it is determined that said new PQ delay budget is not optimized, then further comprising the method steps of:
   incrementing to a next more beneficial print quality improvement in said prioritized list;
   generating a second new PQ delay budget based on said next more beneficial print quality improvement; and
   determining whether said second new PQ delay budget is optimized.

20. The method of claim 16, wherein if it is determined that said new PQ delay budget is optimized, then further comprising the method step of determining whether an overall print quality resulting from said corresponding print quality improvement for a region of interest is justified based on at least one of a media type and an image content.

21. The method of claim 20, wherein if it is determined that said overall print quality resulting from said corresponding print quality improvement is not justified, then further comprising the step of reverting back to said current printer settings.

22. The method of claim 20, wherein if it is determined that said overall print quality resulting from said corresponding print quality improvement is justified, then further comprising the step accepting said corresponding print quality improvement.

23. A method for adaptively matching print quality and performance in a host based printing system including a host computer connected to a printer via an interface, the method comprising the steps of:
   determining a print process time corresponding to an amount of time for a page to print based on current printer settings of said printer;
   determining a quantity of data to be transferred from said host computer to said printer;
   determining a data transfer time corresponding to an amount of time required to transfer said quantity of data from said host computer to said printer via said interface;
   comparing said print process time to said data transfer time to generate a PQ delay budget, said PQ delay budget corresponding to an estimated amount of time that can be used by said printer to improve print quality without adversely impacting printing performance; and
   determining optimum printer settings for said printer based on said PQ budget.

24. The method of claim 23, wherein the step of determining optimum printer settings further comprises the steps of:
   generating a prioritized list of print quality improvements for said printer, wherein each print quality improvement in said prioritized list identifies at least one print quality setting for said printer; and
   correlating said PQ delay budget to one print quality improvement of said prioritized list of proposed print quality improvements.

25. The method of claim 24, further comprising the steps of:
   determining a revised print process time based on the correlated one print quality improvement;
   comparing said revised print process time to said data transfer time to determine a new PQ delay budget; and
   determining whether said new PQ delay budget is optimized.

26. The method of claim 25, wherein in said step of determining whether said new PQ delay budget is optimized, if it is determined that a printhead of said printer will be stalled due to waiting on print data to be received via said interface, then said new PQ delay budget is not optimized, and if it is determined that said printhead of said printer will not be stalled due to waiting on print data to be received via said interface, then said new PQ delay budget is optimized.

27. The method of claim 25, wherein if it is determined that said new PQ delay budget is not optimized, then further comprising the method steps of:
   selecting a next more beneficial print quality improvement from said prioritized list; and
   determining whether said next more beneficial print quality improvement results in an optimized PQ delay budget.

28. The method of claim 25, wherein if it is determined that said PQ delay budget is optimized, then further comprising the method step of determining whether an overall print quality resulting from said correlated one print quality improvement is justified based on at least one of a media type and a content of said page.

29. The method of claim 28, wherein if it is determined that said overall print quality resulting from said correlated one print quality improvement is not justified, then further comprising the step of reverting back to said current printer settings.

30. The method of claim 28, wherein if it is determined that said overall print quality resulting from said correlated one print quality improvement is justified, then further comprising the step accepting said first print quality improvement.

31. A method for adaptively matching print quality and performance in a host based printing system including a host computer connected to a printer via an interface, the method comprising the steps of:
   determining a print process time corresponding to an amount of time for a page to print based on current printer settings of said printer;
   determining a quantity of data to be transferred from said host computer to said printer;
   determining a data transfer time corresponding to an amount of time required to transfer said quantity of data from said host computer to said printer via said interface;
   comparing said print process time to said data transfer time to determine an amount of time that can be used by said printer to improve print quality; and
   determining optimum printer settings for said printer based at least in part on said amount of time determined in the comparing step.

32. The method of claim 31, wherein the step of comparing further comprises the step of generating a PQ delay budget corresponding to an estimated amount of time that can be used by said printer to improve print quality without adversely impacting printing performance.

33. The method of claim 32, further comprising the step of determining whether said PQ delay budget is optimized, wherein if it is determined that a printhead of said printer will be stalled due to waiting on print data to be received via said interface, then said PQ delay budget is not optimized, and if it is determined that said printhead of said printer will not be stalled due to waiting on print data to be received via said interface, then said PQ delay budget is optimized.

34. The method of claim 32, wherein the step of determining optimum printer settings further comprises the steps of:
   generating a prioritized list of print quality improvements for said printer, wherein each print quality improvement in said prioritized list identifies at least one print quality setting for said printer; and
   correlating said PQ delay budget to one print quality improvement of said prioritized list of proposed print quality improvements.

35. The method of claim 34, further comprising the steps of:
   determining a revised print process time based on the correlated one print quality improvement;
   comparing said revised print process time to said data transfer time to determine a new PQ delay budget; and
   determining whether said new PQ delay budget is optimized.

* * * * *